J. KRITCH.
Carriage Wheel-Hub.
No. 205,965. Patented July 16, 1878.
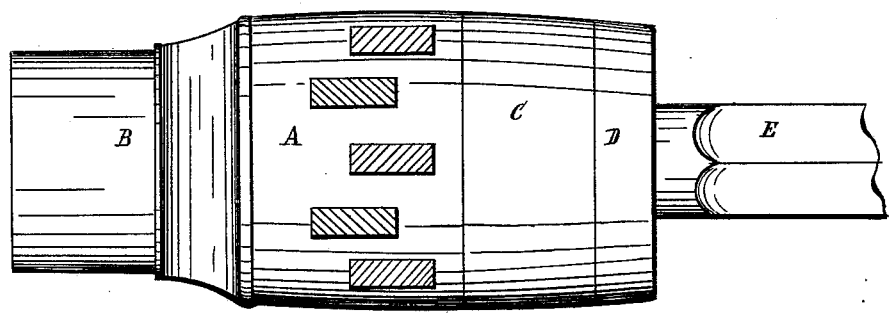
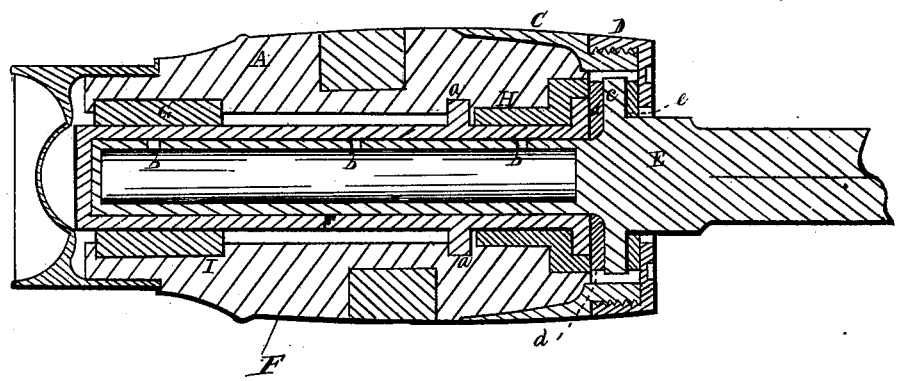
Witnesses.
W. R. Underhill
A. H. Jones
Inventor.
Jacob Kritch
Per Burridge & Co
Attys.

UNITED STATES PATENT OFFICE.

JACOB KRITCH, OF CLEVELAND, OHIO.

IMPROVEMENT IN CARRIAGE-WHEEL HUBS.

Specification forming part of Letters Patent No. 205,965, dated July 16, 1878; application filed May 8, 1878.

*To all whom it may concern:*

Be it known that I, JACOB KRITCH, of Cleveland, in the county of Cuyahoga and State of Ohio, have invented a certain new and Improved Carriage-Wheel Hub; and I do hereby declare that the following is a full, clear, and complete description thereof, reference being had to the accompanying drawings, making a part of the same.

Figure 1 is an external view of the hub and axle. Fig. 2 is a longitudinal section.

Like letters of reference refer to like parts in the several views.

The nature of this invention relates to carriage-wheel hubs; and has for its object the prevention of a rapid wearing of the axle, and also to relieve the wheel and carriage from the shocks and jolting consequent upon running upon rough, uneven roads and pavements, thereby rendering the hub and axle more durable, and the vehicle more easy to ride in, all of which is accomplished, in part, by an elastic bush or bushes inserted in the hub, and upon which the axle-box has its bearing, instead of bearing directly upon the wood of the hub.

For a more full understanding of the invention, reference will be had to the following detailed description.

The hub above alluded to consists of the wooden center or hub A, which may be of any suitable shape and size. On the outer end of the hub is a band or cap, B, inclosing said end and the bore thereof; hence no access is had to the inside of the hub from its outer end. On the inner end of the hub is a band, C, provided with a screw-cap, D, in which is a central opening for the admission of the axle E, of which F is the box. Interposed between the axle-box and the hub are elastic collars or bushes G and H, whereby said box is prevented from being in contact with the hub, it having its bearings therein upon the cushions or elastic bushes G and H.

In thus insulating the axle from the hub by the bushes it is cushioned therein. Hence any jolting and jarring that the wheel may receive is not wholly transmitted to the axle, it being broken by and expended upon the collars or bushes.

The axle-box is prevented from turning in the hub by the lugs $a$, projecting from the sides of the box into the hub, gains or grooves being cut in the sides of the bore of the hub for the admission of the lugs on inserting the box therein.

The axle is secured to the hub as follows: It will be observed in Fig. 2 that the band or collar C extends so far beyond the end of the hub and the box therein as to admit of the collar $c$ of the axle and the washers $d$ and $e$ (respectively on the sides thereof) between the screw-cap D, above alluded to, and the end of the hub, substantially as shown in said Fig. 2.

It will be obvious that the screw-cap D must hold the axle securely in the hub, and at the same time exclude dust and dirt from the axle. The washer $e$, inclosing the neck of the axle, shuts out dust, &c., from passing in around the neck of the axle through the opening in the cap. Hence the axle and box are wholly free from the wearing influence of dirt and dust to which ordinary hubs are liable.

The axle above referred to is straight, and also hollow. Said hollow is for holding the lubricator, which flows therefrom to the axle-box through the perforations $b$.

In view of the exclusion of dirt, dust, &c., from the axle, but little lubrication is required, and from the fact that the axle-box is cushioned and insulated from immediate contact with the hub, there can be exerted upon the axle no hard percussive blows to cause undue strain upon it, and consequent frictional wearing. Hence the wheel will run for a long period of time without oiling or special care and attention being paid to it.

Bushes have been heretofore held in place by washers or glands screwed into the end of the hub; but, however, it will be observed that the bush G is held in a recess, I, formed in body of the hub, having a shoulder on each side of the bush, thereby dispensing with the extra washer or gland; also, said recess allows the use of a thick bush around the box, and also prevents the bush from moving laterally in the bore of the hub.

What I claim as my invention, and desire to secure by Letters Patent, is—

In elastic hubs for wheels, the wooden hub A, having formed therein an annular groove or recess provided at each end with a shoulder in which to secure the elastic ring or cushion G, as herein described, and for the purpose specified.

JACOB KRITCH.

Witnesses:
    J. H. BURRIDGE,
    K. E. KRITCH.